(12) United States Patent
Ishizuka

(10) Patent No.: US 7,259,863 B2
(45) Date of Patent: *Aug. 21, 2007

(54) GRATING INTERFERENCE TYPE OPTICAL ENCODER

(75) Inventor: Ko Ishizuka, Saitama (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/416,889

(22) Filed: May 2, 2006

(65) Prior Publication Data

US 2006/0203252 A1 Sep. 14, 2006

Related U.S. Application Data

(63) Continuation of application No. 10/752,335, filed on Jan. 5, 2004, now Pat. No. 7,061,624.

(30) Foreign Application Priority Data

Jan. 6, 2003 (JP) ............................. 2003-000371

(51) Int. Cl.
*G01B 11/02* (2006.01)
(52) U.S. Cl. ..................................... 356/499
(58) Field of Classification Search ................ 356/494, 356/499, 521; 250/231.16, 231.14, 237 R
See application file for complete search history.

(56) References Cited

U.S. PATENT DOCUMENTS 6,075,600 A * 6/2000 Nagano et al. ............. 356/482
6,570,660 B2 5/2003 Ishizuka et al.
6,958,469 B2 * 10/2005 Ishizuka ................ 250/231.16
7,061,624 B2 * 6/2006 Ishizuka ..................... 356/499
2002/0021448 A1 2/2002 Ishizuka et al.

FOREIGN PATENT DOCUMENTS

JP  8-327401  12/1996
JP  2001-336952  12/2001

OTHER PUBLICATIONS

European Patent Office Search Report of European Patent Application No. 03 25 8231, dated May 18, 2004 (4 pages).

* cited by examiner

*Primary Examiner*—Tarifur Chowdhury
*Assistant Examiner*—Jonathan M Hansen
(74) *Attorney, Agent, or Firm*—Morgan & Finnegan LLP

(57) ABSTRACT

A grating interference type optical encoder has a scale board, a diffraction grating located on the scale board, a light receiving element, an illumination optical system for emitting a coherent light fluxes to the diffraction grating on the scale board that relatively moves, to produce two diffraction light fluxes having different orders, an arc-shaped grating for re-emitting to the diffraction grating the two diffraction light fluxes having the different orders which are produced in the diffraction grating portion through a deflection unit, and a light guiding unit for superimposing rediffraction light fluxes produced by rediffracting the diffraction light fluxes re-emitted to the diffraction grating and guiding the superimposed rediffraction light fluxes to the light receiving element. The grating interference type optical encoder further includes: a phase grating that divides the rediffraction light fluxes superimposed between the diffraction grating and the light receiving element into a plurality of light fluxes, and a linear deflection element having different deflection directions corresponding to the plurality of light fluxes divided by the phase grating.

4 Claims, 3 Drawing Sheets

GRATING INTERFERENCE TYPE OPTICAL ENCODER

This application is a continuation of application Ser. No. 10/752,335, filed Jan. 5, 2004 now U.S. Pat. No. 7,061,624 which is incorporated herein in its entirety.

BACKGROUND OF THE INVENTION

1. Field of the Invention

The present invention relates to an encoder for detecting position or angle information, which is employed for an industrial measurement machine and the like.

2. Related Background Art

Up to now, the applicant of the present invention has proposed a so-called grating interference type encoder that detects variations in position and velocity of an object by utilizing a light diffraction interference phenomenon. In particular, there has been proposed an encoder having a far higher resolution than a geometrical optical encoder, which is obtained in the case where a minute scale of the micron order is used and two of light fluxes diffracted by the scale are taken out to interfere with each other (Japanese Patent Application Laid-Open No. 2001-336952 or the like). Those encoders have a structure in which the wave fronts of the two diffraction light fluxes are synthesized to produce an interference pattern. However, because the encoders are of an interference optical system, it is very hard to process respective optical elements and to improve alignment accuracy thereof under the current circumstances. In particular, in the case of a so-called built-in type encoder having a scale section and a detection head section which are separately provided, the user him/herself has to attach the scale section and the detection head section to a motor, a stage, and the like. Therefore, a problem arises in that the alignment operation becomes complicated. In addition, in the case where the scale section and the detection head section are attached to an actual device, it is desired to further reduce the sizes thereof.

Also, in order to realize higher accurate measurement control, an origin position measurement with reproducibility becomes important. Up to now, it is general that an additional origin detecting sensor is provided somewhere to a rotary mechanism connected with the rotational axis of the grating interference type encoder to ensure the measurement reproducibility.

However, according to the conventional technique, the high-precision grating interference type encoder and the origin detecting sensor provided to the mechanism are separately provided. Thus, it is difficult to sufficiently ensure the measurement reproducibility because of rigidity of the connected mechanism and an Abbe error. Therefore, there are drawbacks concerning size reduction of an applied device and incorporation and adjustment operation of an encoder. As counter measures capable of solving the above-mentioned drawbacks, the applicant of the present invention has proposed a technique for reducing the influence of an alignment error and various grating interference type encoders that provide an origin detection output in addition to an encoder output by producing an origin detection pattern in the vicinity of a grating to be measured of a grating interference type encoder.

However, in order to pursue a downsized and higher precision detecting sensor or encoder, and an improved easiness of its incorporation, further technical improvements have been required.

SUMMARY OF THE INVENTION

The present invention has been devised regarding a small size, thin, and high resolution encoder of such a type or the like, and it is an object of the present invention is to realize a grating interference type encoder in which a labor of complicated alignment operation can be reduced and an origin detecting optical system can be added in a structure capable of separating a scale section from a detection head section without impairing size reduction and thickness reduction.

In view of the above-mentioned problems, a grating interference type optical encoder according to the present invention includes:

an illumination optical system for emitting coherent light fluxes to the diffraction grating that relatively moves, to produce two diffraction light fluxes having different orders;

an arc-shaped grating for re-emitting to the diffraction grating the two diffraction light fluxes having the different orders which are produced in the diffraction grating through a deflection means; and light guiding means for superimposing rediffraction light fluxes produced by rediffracting the diffraction light fluxes re-emitted to the diffraction grating and guiding the superimposed rediffraction light fluxes to a light receiving element, and is characterized by a phase grating that divides the rediffraction light fluxes superimposed between the diffraction grating and the light receiving element into a plurality of light fluxes; and a linear polarizing element having different directions corresponding to the plurality of light fluxes divided by the phase grating.

The grating interference type optical encoder described above further includes:

an origin detecting pattern formed near the diffraction grating integrally provided on the scale board;

a light flux separating element for deflecting a part of the coherent light fluxes to guide the part of the coherent light fluxes deflected onto the origin detecting pattern; and origin signal detecting means for detecting only a reflection diffraction light flux optically modulated by the origin detecting patter

DETAILED DESCRIPTION OF THE PREFERRED EMBODIMENTS

Figure 1:
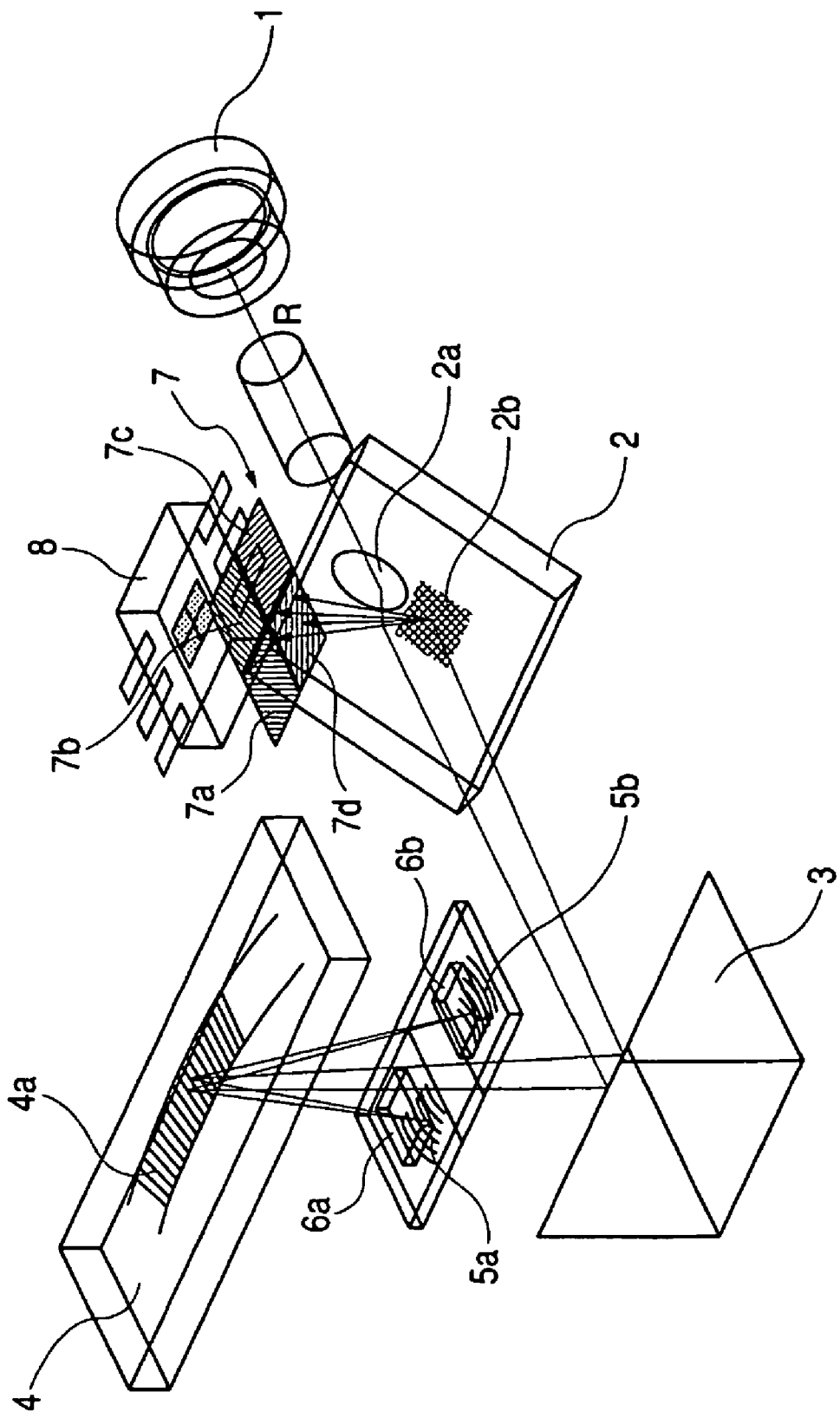
FIG. 1 shows a grating interference type encoder using arc-shaped reflection gratings according to a first embodiment of the present invention.

Hereinafter, a first embodiment of the present invention will be described with reference to FIG. 1.

A light flux R emitted from a semiconductor laser 1 transmits through a beam splitter 2 including a reflection film and a partial transmission window 2a, travels to a reflection mirror 3, and transmits through an optical transmission window portion of an arc grating element board 5.

The light flux transmitting through the transmission portion of the arc grating element board 5 illuminates a diffraction grating scale 4. Reflection and diffraction light fluxes R+ and R− transmit through ⅛ wavelength plates 6a and 6b which are provided on an optical path and illuminate arc-shaped reflection gratings 5a and 5b. Here, in the case where a pitch of a grating 4a in the diffraction grating scale 4 is taken by P1, a pitch P2 of each of the arc-shaped reflection gratings 5a and 5b is set so as to satisfy the following relationship.

$$P2=P1/2$$

The arc-shaped reflection gratings 5a and 5b each are a grating which is made from a portion of concentric circles and has a constant pitch. If the arc-shaped reflection gratings 5a and 5b are locally viewed, they each act as a diffraction grating having the grating pitch P2. Light fluxes are diffracted to a former orientation, transmit through the ⅛ wavelength plates 6a and 6b again, reflected on the diffraction grating scale 4 at a substantially identical position, diffracted again, superimposed on each other, and returned to the beam splitter 2.

At this time, reciprocating transmission of fluxes through the ⅛ wavelength plates 6a and 6b is performed, the optical axes of the wavelength plates being displaced by 90 degrees. Accordingly, the light fluxes become circularly polarized light fluxes which are rotated in directions reverse to each other. Further, because the optical axes of the light fluxes are aligned with each other, in the case where the polarization states are vectorially synthesized with each other, the light fluxes become linear polarized light whose polarization plane is rotated according to a phase difference between +first order diffraction light and −first order diffraction light.

Then, the light is reflected and diffracted on a staggered phase grating 2b recorded on a reflection surface of the beam splitter 2, and divided into four light fluxes. The divided four light fluxes are detected by a four-division light receiving element array 8 including four light receiving elements through respective polarizing elements 7 which are disposed in front of respective light receiving surfaces of the four-division light receiving element array 8 in different orientations. Note that, in the case where ±first order diffraction light fluxes are used, a light-dark cycle of interference is 4 periods per movement corresponding to one pitch of the scale grating. In addition, light-dark cycle signals which are obtained from the four light receiving elements each are a sine wave and these phases are shifted from one another. If the orientations of the polarizing elements 7 (7a, 7b, 7c, and 7d) are made different from one another by 45 degrees, the phases are shifted from one another by 90 degrees.

Note that, in this embodiment, the number of light receiving elements is four; the number of light receiving elements may be two or three.

The grating interference type encoder in this embodiment is capable of correcting a deviation of an optical path due to a variation in wavelength of a light source, from the effects of the arc-shaped reflection gratings 5a and 5b as well as correcting an alignment error. Therefore, even in the case of the encoder in which the scale grating and a detection head are separately provided, the attachment is relatively easy. In addition, the number of structural parts is very small, so that reductions in size and thickness are possible.

Figure 2:
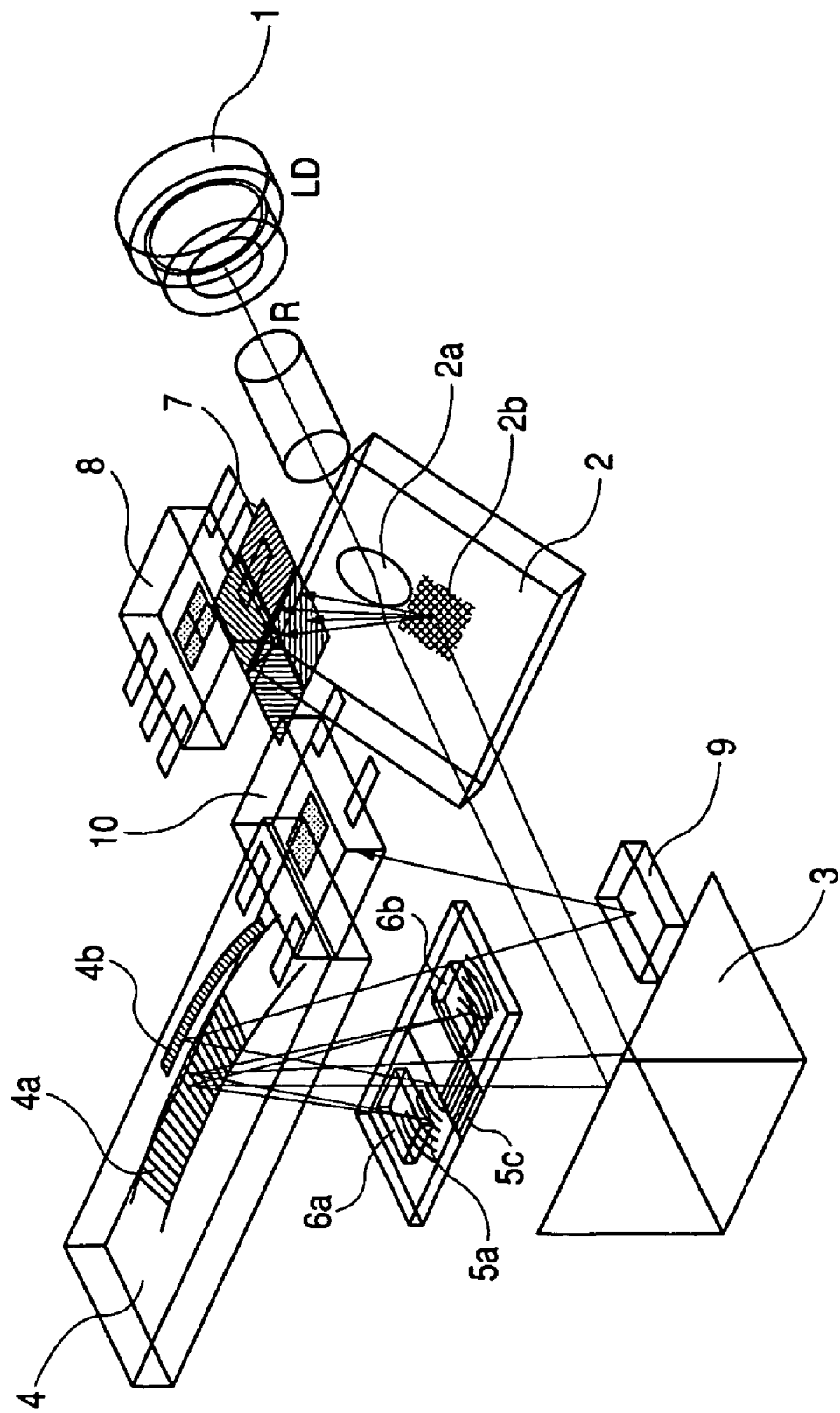
FIG. 2 shows a grating interference type encoder according to a second embodiment obtained by including an origin detecting optical system in the first embodiment of the present invention.

FIG. 2 is an optical arrangement view showing a grating interference type encoder according to a second embodiment obtained by adding an origin detecting optical system to the first embodiment of the present invention.

The same reference symbols are provided to the same portions as in FIG. 1 and the description thereof is omitted here.

An optical system for generating or detecting an incremental signal is substantially identical to the optical system shown in FIG. 1 and further includes a transmission diffraction grating portion 5c in the arc grating element board. A light flux transmits through the transmission diffraction grating portion 5c of the arc grating element board at zero-order diffraction.

Next, an optical system for detecting an origin signal will be described. The light flux that transmits through the transmission diffraction grating 5c of the arc grating element board at the zero-order diffraction is deflected and illuminates a pattern of an origin track 4b adjacent to the grating 4a in the diffraction grating scale 4. A reflection light amount and the like are modulated by the origin track pattern. Reflection light is guided to an origin light receiving element 10.

The origin light receiving element 10 outputs a signal representing a change in reflection light amount as an origin signal by binary processing or the like.

Here, the transmission diffraction grating portion 5c of the arc grating element board as shown in FIG. 2 is a linear lamellar diffraction grating. In order to branch a light flux from an incremental signal detection light flux to use the respective light fluxes, a pitch, a step, and the like of the transmission diffraction grating are set so as to obtain a predetermined distribution ratio. For example, quartz (1.45 in refraction index) is used as a board material of the transmission diffraction grating and a semiconductor laser having a wavelength of 780 nm is used as a light source. In the case where a first-order deflection light flux which is about 12% of the entire light flux is picked up, an unevenness ratio of the lamellar diffraction grating may be set to 1:1 and the step may be set to about 0.33 μm. A deflection angle is provided by an angle of a light flux incident into the transmission diffraction grating and the pitch of the transmission diffraction grating.

Figure 3:
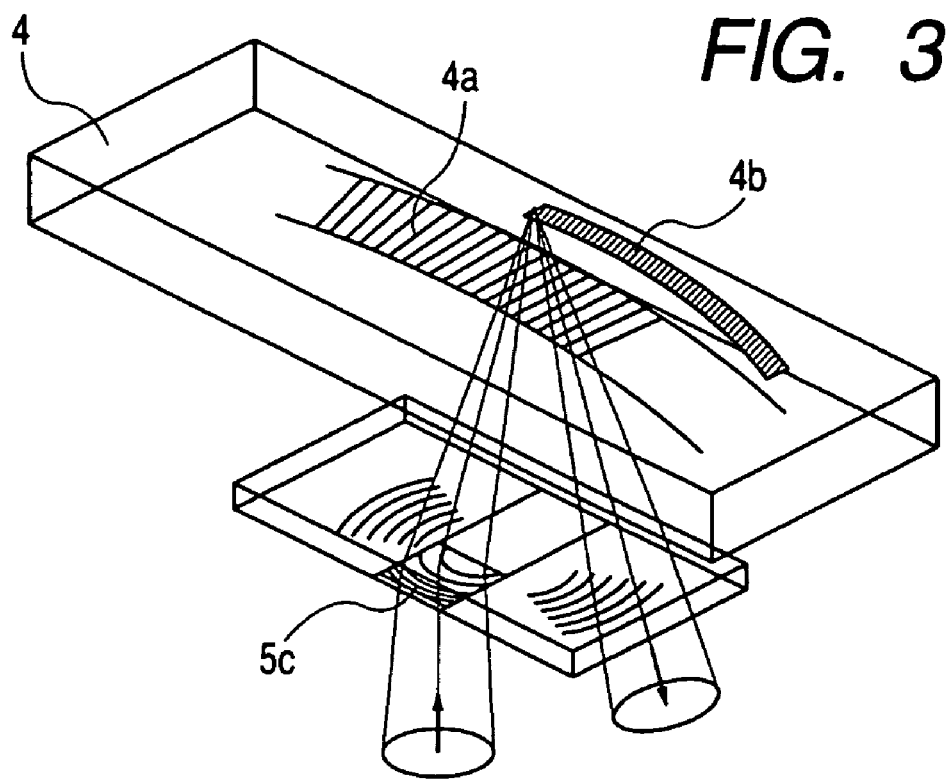
FIG. 3 shows an example in which a Fresnel lens is used as a branch transmission grating.
Figure 4:
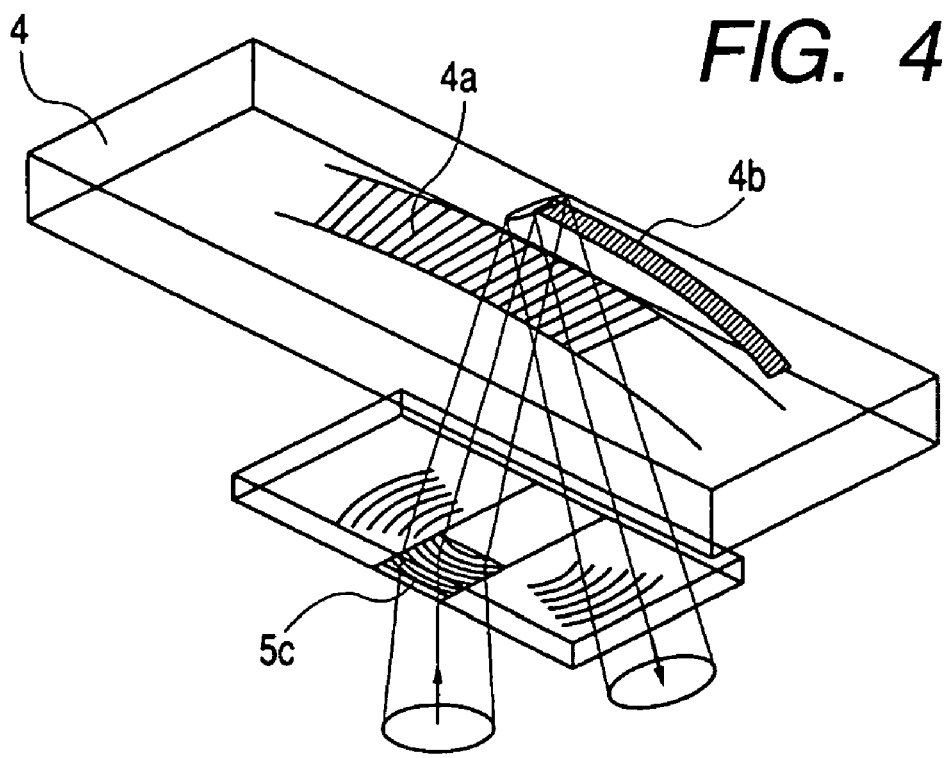
FIG. 4 shows an example in which a hyperbolic grating is used as the branch transmission grating.

Also, the origin track pattern is a binary pattern in which a reflection light amount in a predetermined direction is modulated (transmission and reflection pattern, diffraction-reflection and simple reflection pattern, or the like). In the case where it is necessary to detect a boundary portion with high precision, as shown in FIG. 3, a shape of the transmission diffraction grating portion 5c is set to a shape pattern of decentered Fresnel lens or the like, so that a light condensing characteristic can be provided. The light condensing characteristic is a characteristic in which light is condensed to be substantially a point shape on the origin track. In an example shown in FIG. 4, a hyperbolic grating is used such that light is linearly condensed on the origin track. Therefore, two characteristics of a deflection characteristic and a linear light condensing characteristic are provided.

As described above, the transmission diffraction grating having a suitable characteristic is formed in the optical transmission window portion of the arc grating element board. While the light flux for origin detection is deflected, a predetermined light amount is produced by separation and the origin track is illuminated with the produced light. Further, the optical system for receiving the light is added. Thus, it is apparent that reductions in size and thickness, a performance allowable to a high resolution of the incremen tal signal due to the former grating interference, a performance allowable to an attachment error can be achieved.

Note that, in order to pick up the light flux for origin detection by branching, an additional board other than the arc grating element board may be prepared.

The following matters of the contents described in the present invention can be partially modified or replaced.

(1) In the embodiments, the mirror is disposed on the optical path to the origin light receiving element and the reflected light is guided to the origin light receiving element on the same board on which a light receiving element for incremental signal detection is formed. However, the light may be directly received.

(2) The arc-shaped reflection gratings are used for the incremental signal detection optical system. However, a three-grating interference type optical system including linear reflection gratings may be used.

(3) The modulation of the reflection light amount is conducted for origin detection. In addition to this, the principle of modulation or the like which is made by the deflection can be used.

(4) The scale grating is formed in a disk shape and replaced by a grating scale in which a radial grating is recorded (change to rotary encoder).

As described above, the grating interference type optical encoder includes: a phase grating that divides, into a plurality of light fluxes, rediffraction light produced by a first diffraction grating which is moved relative to the three-grating interference type optical system using the arc-shaped diffraction gratings; and a deflection plate that deflects the divided rediffraction light fluxes in different deflection direction. In addition, the structure in which the plurality of rediffraction light fluxes are separately detected through the deflection plate is used. Therefore, a light projecting/receiving system can be disposed on one side with respect to the diffraction gratings that are relatively moved. In addition, a second diffraction grating that produces the origin detection light by separation can be formed on the same board on which the arc-shaped diffraction gratings are formed. Thus, the following effects are obtained.

(1) A plurality of functions are provided to a planar optical element, so that the number of parts is small and it is suitable to reduce a size.

(2) The arc-shaped reflection gratings and the transmission diffraction grating are processed by a process such as a glass etching, so that there is the mass production is possible.

What is claimed is:

1. A grating interference type optical encoder, comprising:
a scale board;
a diffraction grating located on the scale board;
a light receiving element;
an illumination optical system for emitting coherent light fluxes to the diffraction grating on the scale board that relatively moves, to produce two diffraction light fluxes having different orders;
an arc-shaped grating for re-emitting to the diffraction grating the two diffraction light fluxes having the different orders which are produced in the diffraction grating through a deflection unit;
light guiding unit that superimposes rediffraction light fluxes produced by rediffracting the diffraction light fluxes re-emitted to the diffraction grating and that guides the superimposed rediffraction light fluxes to a light receiving element;
a phase grating that divides the rediffraction light fluxes superimposed between the diffraction grating and the light receiving element into a plurality of light fluxes;
a linear polarizing element having different polarizing directions corresponding to the plurality of light fluxes divided by the phase grating;
an origin detecting pattern formed near the diffraction grating on the scale board;
a light flux separating element for deflecting a part of the coherent light fluxes to guide the part of the coherent light fluxes deflected onto the origin detecting pattern; and
origin signal detecting unit that detects only a reflection diffraction light flux optically modulated by the origin detecting pattern.

2. A grating interference type optical encoder according to claim 1, wherein the arc-shaped grating is a reflection type diffraction grating.

3. A grating interference type optical encoder according to claim 1, wherein the light flux separating element is a diffraction grating and has a grating shape for guiding the part of the coherent light fluxes onto the origin detecting pattern while a point condensing characteristic or a linear condensing characteristic is provided to the diffraction grating.

4. A grating interference type optical encoder according to claim 1, wherein the light flux separating element is formed on a board on which the arc-shaped grating is formed.

* * * * *

UNITED STATES PATENT AND TRADEMARK OFFICE
CERTIFICATE OF CORRECTION

| | |
|---|---|
| PATENT NO. | : 7,259,863 B2 |
| APPLICATION NO. | : 11/416889 |
| DATED | : August 21, 2007 |
| INVENTOR(S) | : Ko Ishizuka |

Page 1 of 1

It is certified that error appears in the above-identified patent and that said Letters Patent is hereby corrected as shown below:

On the Title Page, item [73]: assignee should read Canon Kabushiki Kaisha --, Tokyo-- (JP).

Signed and Sealed this

Twenty-seventh Day of October, 2009

David J. Kappos
*Director of the United States Patent and Trademark Office*